(12) United States Patent
Gaiser et al.

(10) Patent No.: US 7,092,383 B2
(45) Date of Patent: Aug. 15, 2006

(54) METHOD FOR SWITCHING ON A SUBSCRIBER SIGNAL, ASSOCIATED SWITCHING OFFICE AND ASSOCIATED PROGRAM

(75) Inventors: Franz Gaiser, Munich (DE); Klaus Hoffmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1020 days.

(21) Appl. No.: 10/001,306

(22) Filed: Nov. 14, 2001

(65) Prior Publication Data

US 2002/0080777 A1    Jun. 27, 2002

(30) Foreign Application Priority Data

Nov. 15, 2000  (EP)  .................................. 00124931

(51) Int. Cl.
*H04L 12/66* (2006.01)
(52) U.S. Cl. ................. 370/352; 370/401; 370/395.52; 370/410; 370/525
(58) Field of Classification Search ................ 370/522, 370/395.2, 236, 352, 467
See application file for complete search history.

(56) References Cited

U.S. PATENT DOCUMENTS

| 5,586,177 | A  | * | 12/1996 | Farris et al. ................. 379/230 |
| 5,926,537 | A  |   | 7/1999  | Birze |
| 6,600,735 | B1 | * | 7/2003  | Iwama et al. ................ 370/352 |
| 6,683,877 | B1 | * | 1/2004  | Gibbs et al. ............. 370/395.2 |
| 6,735,175 | B1 | * | 5/2004  | Havens ....................... 370/236 |
| 6,754,180 | B1 | * | 6/2004  | Christie ....................... 370/236 |
| 6,765,912 | B1 | * | 7/2004  | Vuong ..................... 370/395.2 |
| 6,826,176 | B1 | * | 11/2004 | Siddiqui et al. ............ 370/352 |
| 6,842,447 | B1 | * | 1/2005  | Cannon ....................... 370/352 |
| 6,944,166 | B1 | * | 9/2005  | Perinpanathan et al. .... 370/401 |
| 2001/0028642 | A1 | * | 10/2001 | Veschi ........................ 370/352 |
| 2002/0073239 | A1 | * | 6/2002  | Hoffman ..................... 709/249 |
| 2003/0002512 | A1 | * | 1/2003  | Kalmanek et al. .......... 370/401 |
| 2004/0125791 | A1 | * | 7/2004  | Hoffmann ................... 370/352 |

FOREIGN PATENT DOCUMENTS

WO    WO 00/39969    7/2000

OTHER PUBLICATIONS

PSTN definition from PC Magazine webpage: http://www.pcmag.com/encyclopedia_term/0,2542,t=central+office&i=39518,00.asp.*
XP-000870631—An Architecture for Residential Internet Telephony Service, Huitema et al., pp. 50-56.

* cited by examiner

*Primary Examiner*—Ricky Q. Ngo
*Assistant Examiner*—Warner Wong
(74) *Attorney, Agent, or Firm*—Bell, Boyd & Lloyd LLC

(57) ABSTRACT

A method for switching on a subscriber signal wherein a transmission path from a calling terminal device of a switched-through telecommunications network to a called terminal device of a packet transmission network is defined using a network transmission function. An alert message comes from the called terminal device end. When the alert message occurs, a following signaling message is generated which indicates that a subscriber signal has not yet been generated for the calling terminal device. The ringing tone is not switched on, and a standard signaling message is not generated, until the following signaling message has been processed.

20 Claims, 5 Drawing Sheets

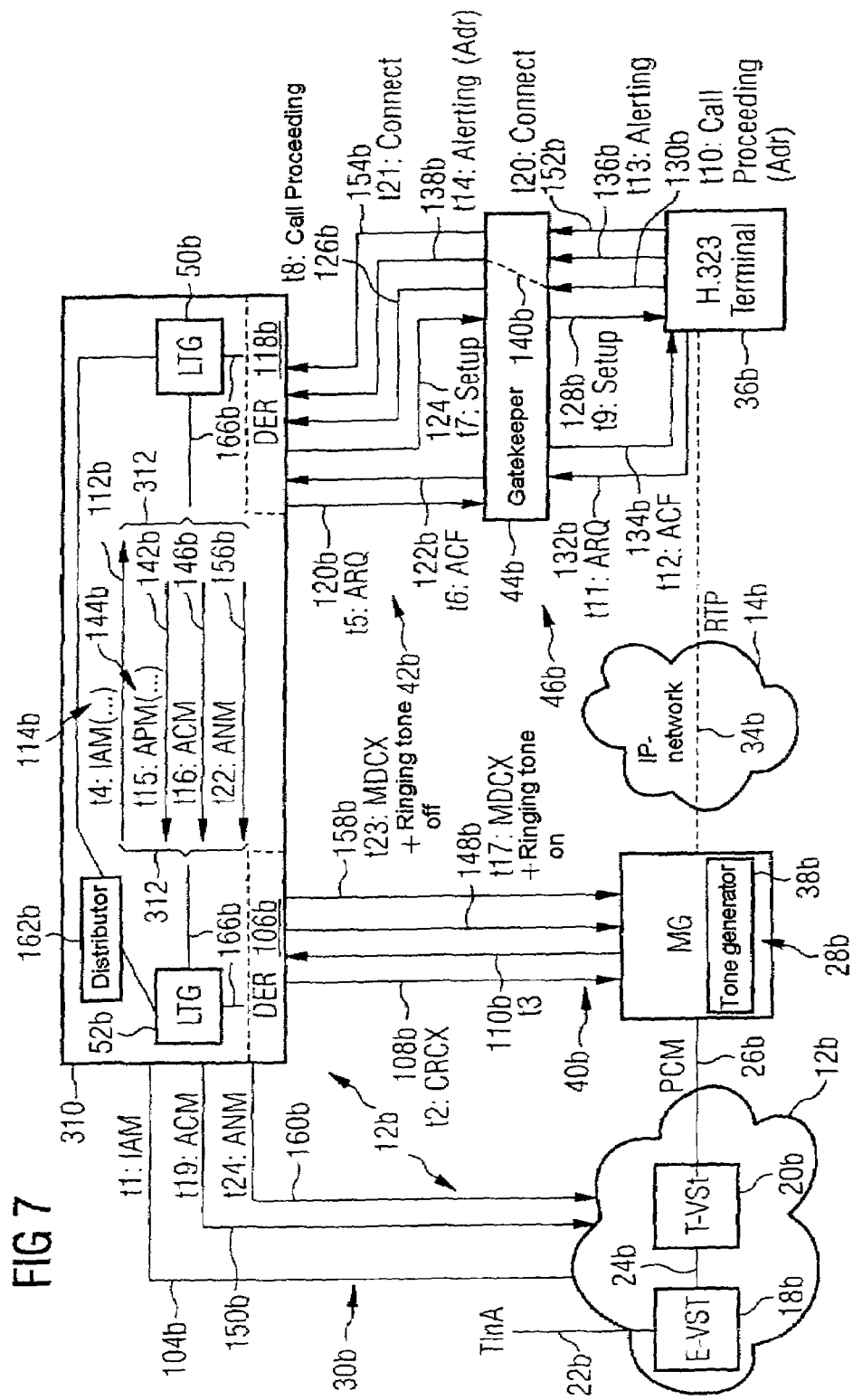

METHOD FOR SWITCHING ON A SUBSCRIBER SIGNAL, ASSOCIATED SWITCHING OFFICE AND ASSOCIATED PROGRAM

BACKGROUND OF THE INVENTION

The present invention relates to a method in which a transmission path from a calling terminal device of a switched-through telecommunications network to a called terminal device of a packet transmission network is defined using a network gateway function. A signaling message which is defined for the packet transmission network comes from the called terminal device end and indicates that the called terminal device is signaling the call to a subscriber. When the signaling message which is defined for the packet transmission network occurs, a signaling message is also generated for the switched-through network. In addition, a subscriber signal, for example a ringing tone, must be transmitted to the calling terminal device.

The switched-through telecommunications network is, for example, a network in which the user data is forwarded in time slots in accordance with a time-division multiplex method; for example, in time slots of a PCM (Pulse Code Modulation) system. Such a network is, for example, the telephone network of Deutsche Telekom AG. The terminal device is, for example, an ISDN (Integrated Services Digital Network) telephone, an analog telephone or a videophone.

The packet transmission network is, for example, the Internet or a data transmission network which operates according to the Internet protocol. However, other packet transmission networks, for example ATM (Asynchronous Transfer Mode) networks, are also used. In an ATM network, the data packets are also referred to as cells. The data packets or cells contain steering data which are used for forwarding the user data contained in the data packets.

In the packet transmission network, signaling is carried out in the wider sense according to protocol SIP (Session Invocation Protocol), see Defacto standard RFC 25423 (Request For Comment) of the IETF (Internet Engineering Task Force), or according to standard H.323 of the ITU-T (International Telecommunications Union—Telecommunications Standardization Sector).

If the standard H.323 is complied with, the following standards defined by the ITU-T are significant:

H.323 (1998) "Packed-based multimedia communications systems";

H.225.0 (1999) "Call signaling protocols and media stream packetization for packed-based multimedia communications systems";

H.450.1 (1998) "Generic functional protocol for the support of supplementary services in H.323";

H.246 (02/98) "Interworking of H-Series multimedia terminals with H-Series multimedia terminals and voice/voiceband terminals on GSTN and ISDN"; and H.246 Annex C (02/00) "ISDN user part function—H.225.0 interworking Annex C".

In the last-mentioned standard, the switching of a subscriber signal, specifically of a ringing tone, when a call is set up from the switched-through network into the packet transmission network is dealt with in section C.7.1.3 "Sending of the Address Complete Message (ACM)". According to the text here, when "voice data" or "3.1 kHz Audio" is transmitted, a ringing tone, for example, should be transmitted to the calling terminal device after the reception of the first alerting message.

An object of the present invention is to devise a simple method for switching on a subscriber signal, in particular a ringing tone. In addition, an associated switching office and an associated program are to be devised as well.

SUMMARY OF THE INVENTION

The present invention is based on the idea that, until now, the network gateway function has been described only very generally; for example, in standard H.246. It is not known where the subscriber signal is to be fed in. It could take place in a unit for providing the network gateway function, in the switching office which adjoins this unit in the switched-through network or in another unit of the switched-through network. In addition, there is certainly a requirement for a standard signaling message to be generated, but how the processing of the signaling message which is defined for the packet transmission network is to be carried out is not stated. The SIP protocol also indicates the network gateway function only in a general way.

The present invention is also based on the idea that at least one other signaling message should also be generated between the signaling message which is defined for the packet transmission network and the signaling message for the switched-through network. Such signaling messages would facilitate the switching-on of the subscriber signaling.

For this reason, in the method according to the present invention, when the signaling message which is defined for the packet transmission network occurs, a following signaling message is generated which indicates that a subscriber signal has not yet been generated for the calling terminal device. The following signaling message thus contains, for example, an indicator in this respect.

The following signaling message is subsequently processed, during which the subscriber signal is switched on. The standard signaling message which is defined for the switched-through network and which indicates that a subscriber signal has already been generated for the calling terminal device is generated only after this.

The following signaling message is thus a message into which the information content of the signaling message which is defined for the packet network can be transferred. Furthermore, the following signaling message is, in this respect, also adapted to the standard signaling message. In addition, the following signaling message already contains information relating to the subscriber signal. The standard signaling message also supplies such an indicator, albeit with a different value. The following signaling message thus forms, with respect to the information content, an intermediate stage between the signaling message which is defined for the packet network and the standard signaling message. The use of such a following signaling message makes it possible to switch on the subscriber signaling at a comparatively freely selectable point in the signaling path. Without such a following signaling message, the switching-on of the subscriber signal would have to be brought about from the point which receives the signaling message which is defined for the packet network. The possibility of choosing results in degrees of freedom in terms of the setting-up of the network gateway function, which permits a simple structure. Thus, units for providing the network gateway function can be set up spatially separated from one another or the network gateway functions can be provided by different modules between which signaling messages are exchanged.

In one embodiment of the method according to the present invention, the following signaling message is a signaling message which is defined for the switched-through network.

To transmit the following signaling message it is possible, in this case, to use signaling methods which are also used for signaling in the switched-through network.

In a further embodiment, the following signaling message and/or standard signaling message are signaling messages according to the ISUP standard (ISDN user part) of the ITU-T. The essence of the ISUP standard is defined in the following standards:

Q.761 (12/99) "Signaling System Number 7—ISDN user part functional description";

Q.762 (2000) "Signaling System Number 7—ISDN user part general function of messages and signals";

Q.763 (1997) "Signaling System Number 7—ISDN— user part formats and codes"; and

Q.764 (09/97) "Signaling System Number 7—ISDN user part signaling procedures".

In another embodiment, the following signaling message is, on the other hand, a signaling message which is defined for the signaling within a switching office of the switched-through network. Signaling messages with the same structure as the following signaling message are also transmitted, within a switching office of the switched-through network, to connecting units which do not provide network gateway functions; for example, to connecting units for connecting subscribers, to connecting units for connecting user data transmission paths to other switching offices and also between the aforesaid units. The internal signaling protocol can, thus, be used for different purposes.

In a further embodiment, the network gateway function is provided using at least two spatially separated units. In one refinement, a network gateway unit transmits the user data between the various networks. A control unit which controls the network gateway unit is set up spatially remote from the network gateway unit and controls the network gateway unit using a defined control protocol. The protocol according to ITU-T standard H.248 "Gateway Control Protocol" or according to Defacto standard RFC 2705 (Request For Comment), which is also known under the name MGCP (Media Gateway Control Protocol), is thus used. This measure enables the control unit to be used to control a number of network gateway units.

In a further embodiment, the standard signaling message is transmitted by a switching office of the switched-through network. Within the framework of the method according to the present invention, only the signaling function of the switching office, but not its switching function, is used to switch user data. As a result of this measure, a large number of functions of the switching office which were previously used for other purposes, namely for switching connections in the switched-through network without the inclusion of the packet transmission network, can also be used for carrying out the method according to the present invention or one of its developments.

In one embodiment of the method according to the present invention, the following signaling message is generated by a further switching office which is set up spatially separated, for example more than 100 kilometers, from the first switching office. This measure makes it possible, for example, to connect the networks of different operators to one another in order to carry out the method according to the present invention.

In another embodiment, the packet transmission network is a network which operates according to an Internet protocol; for example, the Internet. However, ATM networks are also used for transmitting the user data. In one embodiment, the switched-through network is a network in which the user data are transmitted in time slots according to a time-division multiplex method; for example, according to the PCM (Pulse Code Modulation) method, see standard G.711 of the ITU-T.

In a further embodiment, signaling in the switched-through network is carried out according to the ISUP standard. The method according to the present invention or its developments are also carried out in switched-through networks outside Europe; for example, in the USA or in Japan. In a further embodiment, the signaling to the subscriber in the packet transmission network is carried out according to the H.323 protocol in the wider sense; i.e., with the standards of this protocol group mentioned at the beginning. Alternatively, the protocol SIP (Session Invocation protocol) which is defined in the Defacto standard RFC 25423 is used for signaling in the packet transmission network.

In a further embodiment, there is no further switching office, or at least one further switching office, of the switched-through network in the signaling path and/or in the transmission path of the user data between a switching office which brings about the switching-on and a unit for providing the network gateway function. Preferably, an originating switching office brings about the switching-on. The originating switching office is the switching office to which the calling terminal device is connected. This measure ensures that the subscriber signaling is carried out with a high degree of quality because of the comparatively short transmission path of the calling terminal device if, specifically, a unit for generating the subscriber signal is also accommodated in the switching office and is that which brings about the switching-on.

Alternatively, the subscriber signal is fed into a unit for transferring user data between the two networks. In this case, customary switching offices could be used between the network gateway function and the calling terminal device. The feeding into the network gateway unit can also be carried out easily; for example, via a control message in accordance with a control protocol.

The subscriber signal is a ringing tone or an announcement which indicates that the called terminal device is signaling the call for a subscriber. In some countries, an announcement is specifically made in place of a ringing tone. If, for example, the protocol MGCP is used, there is a parameter "rt" in what is referred to as a "Generic Media Package", see RFC 2705, section 6.1.1, for the ringing tone. In what is referred to as an "Announcement Server Package", there is a parameter "ann" which can be used for controlling an announcement, see RFC 2705, section 6.1.9.

In another embodiment, the following signaling message contains an indicator whose value depends on whether the terminal device is occupied or busy. The indicator of the occupied state and the indicator of the subscriber signal are checked by reference to the following signaling message. The switching-on of the subscriber signal is brought about only if the called terminal device is free and if a subscriber signal has not yet been generated. This measure makes it possible to ensure that the subscriber signal also can, for example, be generated by the called terminal device. Duplicate feeding-in of the subscriber signal is avoided by virtue of the checking because the indicator relating to the subscriber signal has a value which does not fulfill the condition. In addition, the checking prevents the ringing tone from being fed in if no ringing signal is necessary.

The present invention also relates to a switching office which is constructed in such a way that during its operation the method according to the present invention, or one of its developments, is carried out. In particular, this switching office permits the switching-on of the subscriber signal.

Furthermore, the present invention relates to a program with an instruction sequence during whose execution the method according to the present invention, or one of its developments, is carried out by a processor. The abovementioned technical effects also apply to the switching office and to the program.

Additional features and advantages of the present invention are described in, and will be apparent from, the following Detailed Description of the Invention and the Figures.

BRIEF DESCRIPTION OF THE FIGURES

FIG. 7 shows a network gateway function which is provided by a single switching office and a network gateway unit which is spatially separated from it.

DETAILED DESCRIPTION OF THE INVENTION

Figure 1:
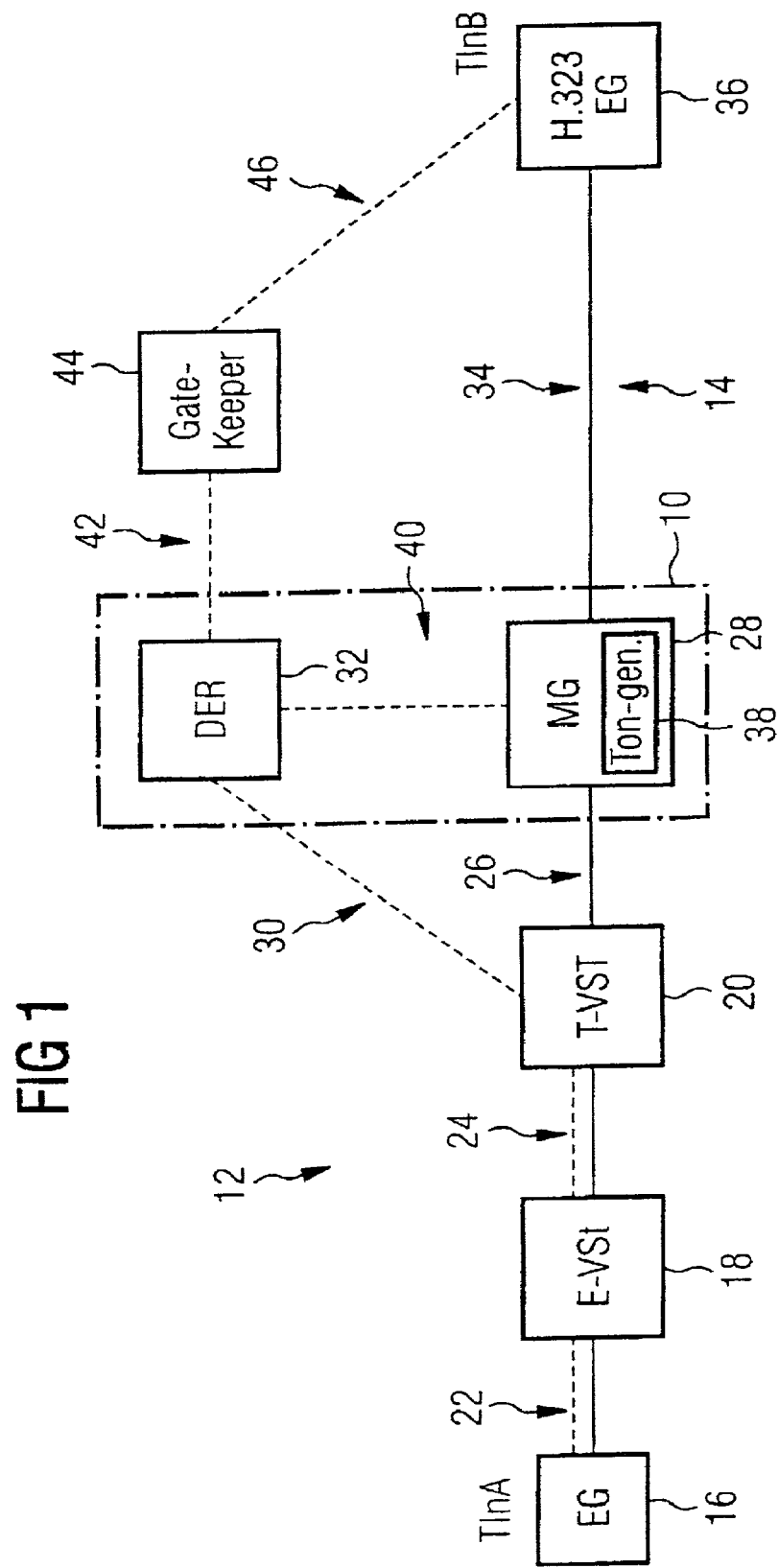
FIG. 1 shows a network gateway function between a telephone network and the Internet.

FIG. 1 shows a network gateway function 10 between a telephone network 12 and a data packet transmission network 14. The telephone network 12 is, for example, the telephone network of Deutsche Telekom AG. FIG. 1 illustrates a terminal device 16 of a calling subscriber TlnA, an originating switching office 18 and a transit switching office 20 of the telephone network 12. There is a subscriber line 22 between the terminal device 16 and the originating switching office 18. The subscriber line 22 is, for example, an ISDN basic access. In FIG. 1, broken lines indicate signaling messages. Continuous lines are transmission paths for user data. Signaling is carried out on the subscriber line 22 according to a subscriber signaling protocol; for example, according to the protocol DSS 1 (Digital Signaling System Number One).

The originating switching office 18 is connected to the transit switching office 20 via a PCM-30 transmission link 24. The voice data are transmitted in a time slot. The signaling is carried out according to an ISUP protocol. The originating switching office 18 and the transit switching office 20 are, for example, conventional switching offices of the type EWSD from Siemens AG or of the type S12 from Alcatel AG.

From the transit switching office 20 there is a PCM-30 transmission link 26 for transmitting the user data to a network gateway unit 28 which performs part of the network gateway function 10. There is a signaling connection 30 between the transit switching office and a service provider computer 32 which also performs part of the network gateway function 10. Signaling is performed on the signaling connection 30 according to the ISUP protocol.

The network gateway unit 28 extracts voice data which are received in a PCM channel of the transmission link 26 and packs them into data packets which are forwarded in the data packet transmission network 14; for example, via a transmission path 34 which leads from the network gateway unit, such as via the Internet, to a terminal device 36 of a subscriber TlnB. On the other hand, data packets received from the data packet transmission network 14 are unpacked in the network gateway unit 28. The user data contained in the data packets are forwarded in a time slot on the PCM-30 transmission link 26. The network gateway unit 28 also contains a tone generator 38 which serves to generate a ringing tone. The processes necessary for this are explained in more detail below with reference to FIGS. 2 and 3.

The service provider computer 32 controls the network gateway unit 28 using the protocol MGCP. The control messages are transmitted via a transmission path 40 which runs, for example, through the Internet. Furthermore, the service provider computer 32 converts signaling messages, which come from the telephone network 12, into signaling messages according to standard H.323 in the wider sense. The converted signaling messages are transmitted via a transmission path 42 to an access unit 44; for example, over the Internet. On the other hand, signaling messages coming from the access unit 44, according to protocol H.323 in the wider sense, are converted into signaling messages of the telephone network 12 and forwarded via the signaling connection 30.

The terminal device 36 is, for example, a terminal device which operates according to standard H.323 in the wider sense. The terminal device 36 is assigned the access unit 44. A signaling path 46 can be set up between the terminal device 36 and access unit 44; for example, via a local data transmission network.

In another exemplary embodiment, the service provider computer 32 and the network gateway unit 28 are not spatially separated from one another. In this case, the transmission link 26 and the signaling connection 30 lead via a common transmission link; for example, via a connecting line. However, the processes explained below with reference to FIGS. 2 through 4 remain essentially the same.

Figure 2:
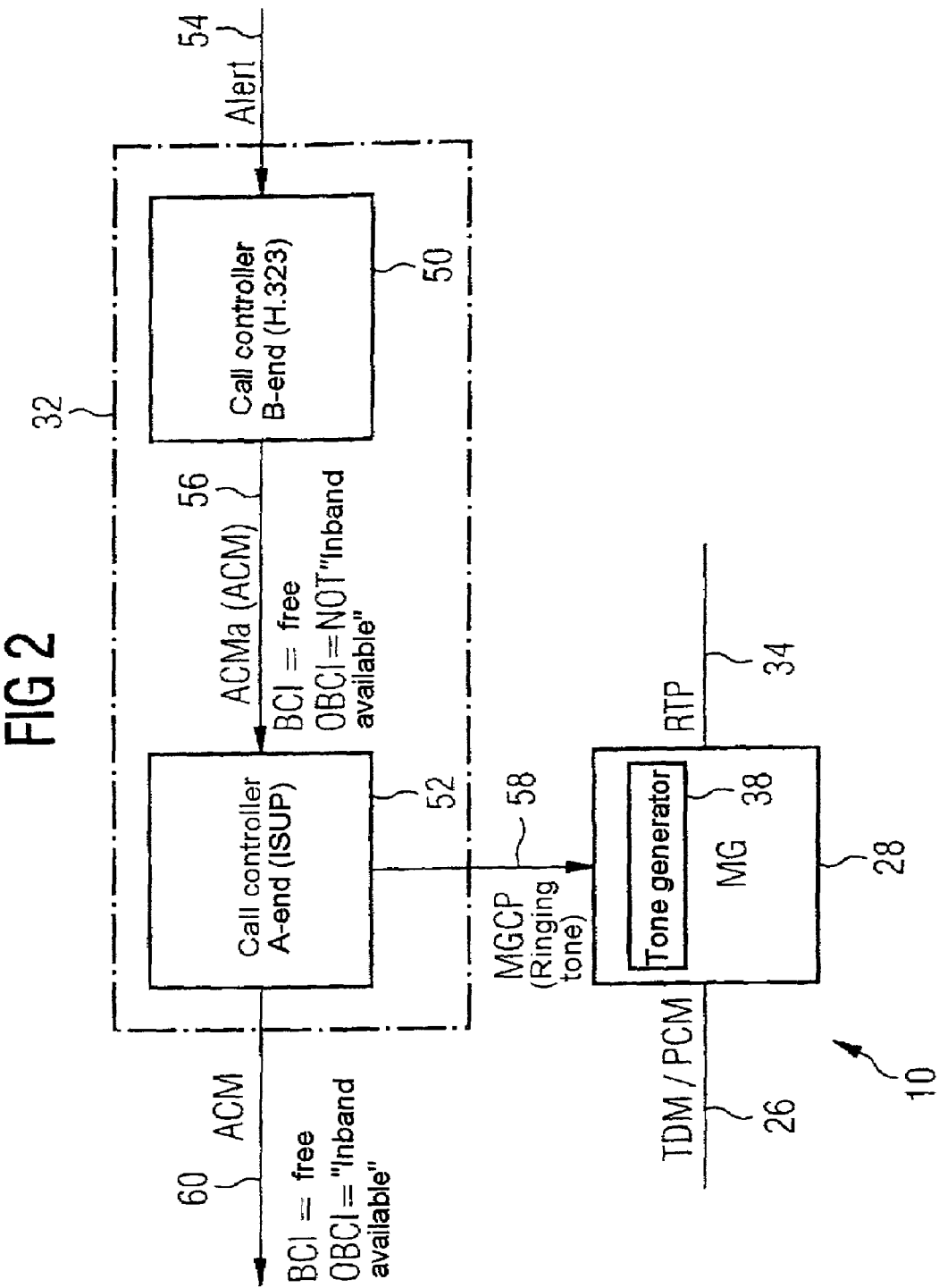
FIG. 2 shows the signaling messages in a service provider computer for providing part of the network gateway function.

FIG. 2 shows signaling messages which are processed and generated by the network gateway function 10. The functions of the service provider computer 32 are performed by two units which are separate from one another, the units being specifically a B-end call controller 50 and an A-end call controller 52. If, during the setup of a transmission path from the subscriber TlnA to the terminal device 36, the call controller 50 receives an alert message 54 which corresponds to the standard H.323 in the wider sense, an internal ACM (Address Complete Message) 56 is generated whose structure is based on the ACM defined in the ISUP standard. The internal ACM 56 is illustrated in FIG. 2 by the sequence of letters ACMa. The ACM 56 contains, as provided in the standard Q.763, section 3.5, a BC indicator BCI (Backward Call Indicator), in which a value which characterizes the free state of the terminal device 36 is noted. In addition, the ACM 56 contains an OBC indicator OBCI (Optional Backward Call Indicator), see standard Q.763, section 3.37. A value which indicates that no inband information is available, i.e. that currently no ringing tone is being fed in, is noted in the OBC indicator.

The ACM 56 is transmitted to the A-end call controller 52 and processed there. In this context, a check is firstly made as to whether a value which indicates that no inband information is available is given in the OBC indicator, and whether a value for the state "free" is noted in the BC indicator BCI. If both conditions are fulfilled, a control message 58 with which the switching-on of the ringing tone is requested is transmitted from the call controller 52 to the network gateway unit 28. The switching-on of the ringing tone is noted in the call controller 52.

During the processing of the control message 58 in the network gateway unit 28, the tone generator 38 is switched on so that a tone is fed into the transmission channel, leading to the subscriber TlnA, in the transmission link 26. After the activation of the tone generator 38, the call controller 52 transmits an ACM 60 to the transit switching office 20. The ACM 60 complies with the standard Q.763. In the BC indicator of the ACM 60, it is also noted that the terminal device 36 is free. On the other hand, in the OBC indicator OBCI of the ACM 60 it is noted that an inband information item is then available.

If an ANM (Answer Message), which is not illustrated, occurs in the call controller 52, the ringing tone is switched off, if the switching-on for the transmission path has been noted, using a control message which is transmitted to the network gateway unit 28. The ANM is also a signaling message which is based to a large degree on the ISUP standard and which is transmitted in the interior of the service provider computer 32. FIG. 7 represents in more detail the processes which are explained in FIG. 2.

In another exemplary embodiment, the service provider computer 32 is composed of two units which are spatially very far apart from one another. One unit contains the call controller 50 and the other unit contains the call controller 52. In place of the ACM 56, an ACM which fulfills the ISUP standard in every respect is transmitted. An example of such a message is explained below with reference to FIG. 3.

Figure 3:
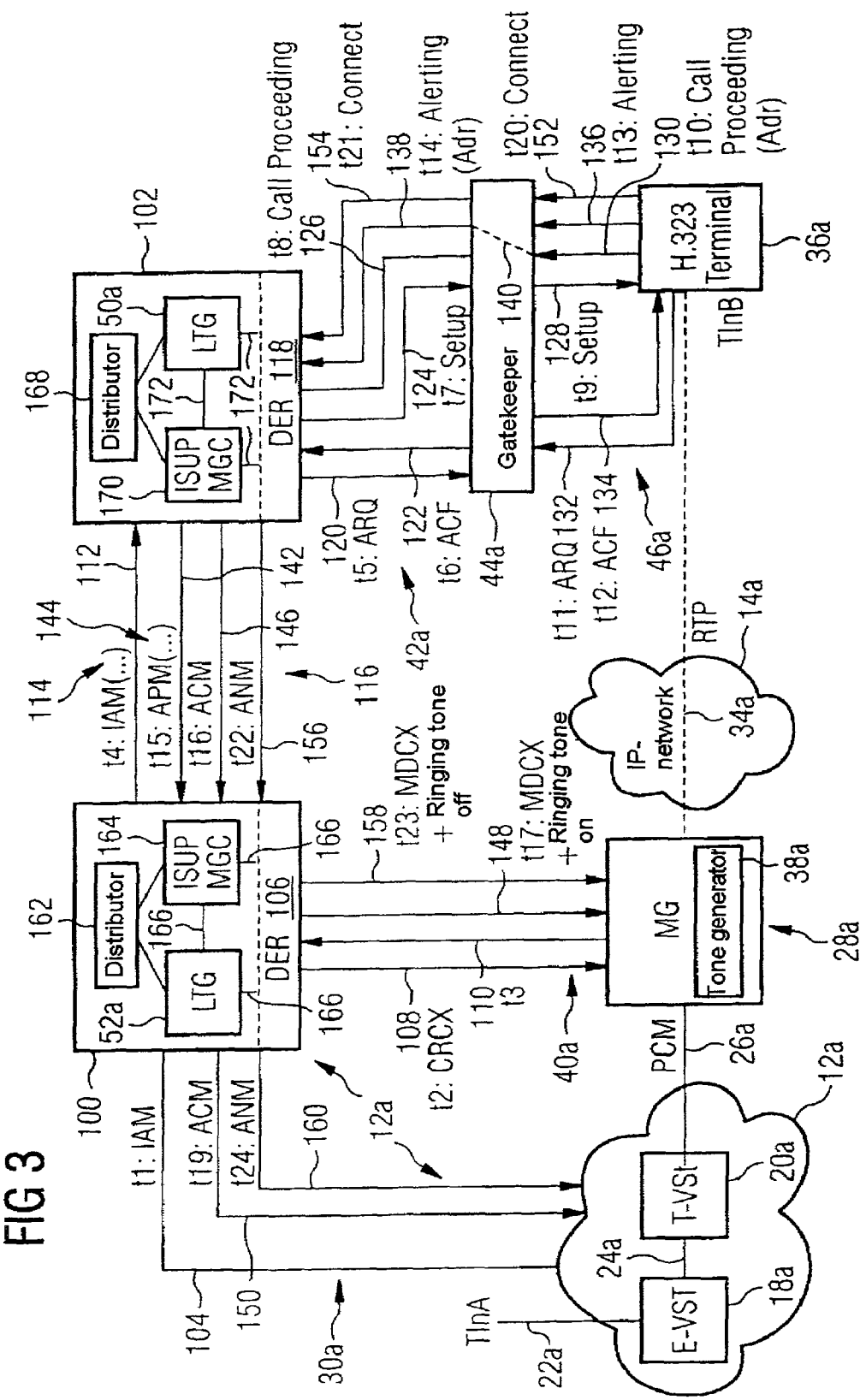
FIG. 3 shows a network gateway function which is provided by two spatially separated switching offices and a remote network gateway unit.

FIG. 3 shows a network gateway function which is performed by two spatially separated switching offices 100 and 102 and by a network gateway unit 28*a*.

Function units which are illustrated in FIG. 3 and which have the same structure and the same function as function units which have already been explained with reference to FIGS. 1 and 2, are illustrated in FIG. 3 with the same reference symbol, which is, however, supplemented with the lower-case letter "a" for differentiation purposes.

Signaling messages for setting up a transmission path for transmitting voice data between the subscribers TlnA and the subscriber TlnB are explained below. During the setup of the voice connection, the switching office 20*a* generates, according to the protocol, at a time t1, a connection setup message 104, also referred to as LAM (Initial Address Message). This message contains, for example, inter alia, the complete call number of the subscriber TlnB and the number of a time slot, to be used for the transmission, on the transmission link 26*a*. The switching office 20*a* operates according to the standard. On the basis of the call number, the transmission link 26*a* is used and signaling messages are transmitted to the switching office 100. In the switching office 100, it is detected from what is referred to as the CIC (Circuit Identification Code) that the network gateway unit 28*a* is to be included in the connection. A control unit of the switching office 100 makes a service provider computer 106 contained in the switching office 100 carry out the steps which are necessary for the inclusion of the network gateway unit 28*a*.

At a time t2 after the time t1, the service provider computer 106 transmits a connection setup message 108 to the network gateway unit 28*a* via the transmission path 40*a* according to the Defacto standard RFC 2705. The connection setup message 108 is also referred to as CRCX (Create Connection) message. In the connection message 108, the time slot which is to be used for the user data transmission is indicated. Inter alia, the method according to standard G.711 is indicated as the CODEC (Coding/Decoding) for an RTP connection which is to be set up. The network gateway unit 28*a* processes the connection setup message 108 and generates as a response a response message 110 at a time t3. The response message 110 confirms, on the one hand, the reception of the connection setup message 108 and contains, inter alia, an Internet address and a port number which can be used for the reception of user data on the transmission path 34*a* which is to be set up between the network gateway unit 28*a* and the terminal device 36*a*. The protocol RTP (Real Time Protocol), see Defacto standards RFC 1889 and RFC 1890, is selected as the transmission protocol on the transmission path 34*a*.

The service provider computer 106 receives the response message 110 and forwards the received Internet address and the port number to the control unit of the switching office 100. The control unit of the switching office 100 processes the connection setup message 104 according to the ISUP protocol and generates a connection setup message 112 at a time t4. The connection setup message 112 is also referred to as an IAM (Initial Address Message) according to the ISUP protocol. The connection setup message 112 contains two information elements which are explained in more detail below with reference to FIGS. 4 and 5 and in which the Internet address and the port number are forwarded, see points 114. These information elements are not defined in the ISUP standard, but are transmitted to the switching office 102 via a signaling connection 116 in compliance with this standard. The information elements are transmitted as a component of signaling messages in a container APP (Application Association Transport) according to standard Q.765 Add. 1 (08/00).

The switching office 102 receives the connection setup message 112 and also processes the information elements contained therein. On the basis of the content of these information elements or by reference to the code (CIC—Circuit Identification Code) for designating the call entity, it is detected that it is not a customary telephone connection that is to be set up, but rather a telephone connection using the data packet transmission network 14*a*. The network access unit 44*a* is determined at the subscriber TlnB end as the network access unit to be used.

A service provider computer 118 contained in the switching office 102 is made, by the control unit of the switching office 102, to set up an Internet connection via the transmission path 42*a* to the network access unit 44*a*. At a time t5, the service provider computer 118 transmits an ARQ (Admission Request) message 120, see standard H.323, in particular section 8.1.2 "Both endpoints registered to the same Gatekeeper", including FIG. 15 of the standard H.323. The ARQ message is processed according to the standard in the network access unit 44*a*. At a time t6, the network access unit 44*a* generates, according to the standard, an ACF message 122 which is transmitted to the service provider computer 18 at a time t6. In the ACF message 122, the network access unit appends an address which is to be used for the following signaling. The service provider computer 118 transmits, at a time t7, a setup message 124, according to the standard, to the address of the network access unit 44*a*, which address is contained in the message 122. The setup message 124 contains an information element which points to a high-speed start, which is also referred to as a fast start. The Internet address and the port number, which previously have been received in the switching office 102, are transferred in an information element of the setup message 124. The aforesaid information elements of the setup message 124 are explained in more detail in the standard H.225, in particular in section 7.3.10.

During the processing of the setup message 124, the network access unit 44a generates, according to the protocol, a call proceeding message 126 for the service provider computer 118 at a time t8. In addition, the information elements contained in the setup message 124 are extracted and forwarded to the terminal device 36a at a time t9 in a setup message 128 according to the protocol. A parameter for the fast start is also given in the setup message 128. During the reception of the setup message 128 in the terminal device 36a, a call proceeding message 130 for the network access unit 44a is generated according to the protocol at a time t10. The call-proceeding message 130 also contains indicators relating to the fast start, specifically the Internet address which is to be used at the terminal device 36a end for the RTP transmission path 34a to be set up, as well as the port address to be used. These indicators are initially stored in the network access unit 44a.

At a time t11, the terminal device 36a transmits an ARQ message 132 in order to obtain approval for the subsequent transmission processes. This approval is assigned at a time t12 using a protocol-compliant ACF message from the network access unit 44a. After the reception of the ACF message 134, the terminal device 36a transmits, at a time t13, an alerting message 136 to the network access unit 44a and simultaneously generates a signal tone in order to alert the subscriber TlnB to the incoming call.

During the reception of the alerting message 136 in the network access unit 44a, an alerting message 138 is generated. The alerting message 138 includes the address and port number transferred at the time t10, see dashed lines 140. The alerting message 138 is transmitted from the network access unit 44a to the service provider computer 118 at a time t14.

During the processing of the alerting message 138, a transport message 142, which is also referred to according to the ISUP protocol as an APM (Application Transport Message), is generated in the switching office 102. The transport message 142 contains information elements with the Internet address and the port number of the terminal device 36a, see point 144. The information elements have the same structure as the information elements explained below with reference to FIGS. 4 and 5. The transport message 142 is transmitted to the switching office 100 at a time t15.

The control unit of the switching office 100 extracts the Internet address and the port number from the transport message 142. The switching office 100 then waits for the arrival of a following ACM 146.

As a result of the alerting message 138 received at the time t14, the switching office 102 generates an ACM (Address Complete Message) 146 according to the ISUP standard at a time t16. The BC indicator BCI of this message contains a value which indicates that the terminal device 36a is free. The OBC indicator OBCI of the ACM 146 contains a value which indicates that there is no inband information, i.e. no ringing tone, available.

The ACM 146 is processed in the switching office 100 according to the protocol. The condition explained with reference to FIG. 2 is checked. It is detected that the conditions relating to the data fields BCI and OBCI are fulfilled. For this reason, the control unit causes the service provider computer 106 to ensure that the ringing tone is connected in the network gateway unit 28a. The connection of a ringing tone is also noted in the switching office 100 for the transmission path 34a which is to be set up.

At a time t17, the service provider computer 106 generates a change message 148 according to the Defacto standard RFC 2705. The change message 148 is also referred to as an MDCX (Modify Connection) message. The change message 148 contains the Internet address and the port number of the terminal device 36a for the RTP transmission path 34a. In addition, the change message 128 contains a data field with which the switching-on of the ringing tone is requested.

The ringing tone can be switched on using the parameter "rt" from the "Generic Media Package", see RFC 2705, section 6.1.1. Reference can be made to the packet via the following parameters:
  the change message 128 contains a parameter "Encapsulated NotificationRequest", see RFC 2705, section 2.3.4 "ModifyConnection";
  the notification request contains a parameter "RequestedEvents", see RFC 2705, section 2.3.2 "NotificationRequest"; and
  from the "RequestedEvents" parameter, the system passes via the chain "requestedEvent", "eventName", "packageName" to the indicator for the packet and finally for the indicator for the parameter "rt" and its value, see RFC 2705, section 3.4 "Formal syntax description of the protocol".

During the processing of the change message 148 in the network gateway unit 28a, the time slot, used for the connection setup, on the transmission link 26a is assigned to the transferred destination parameters of the terminal device 36a. In addition, the tone generator 38a is actuated in such a way that a ringing tone is sent to the subscriber TlnA, which indicates to the subscriber that the terminal device 36a is calling the subscriber TlnB. A response message, generated by the network gateway unit 28a, to the change message 148 is not illustrated in FIG. 3.

During the processing of the ACM 146, the switching office 100 also generates an ACM 150, which is transmitted to the transit switching office 20a at a time t19. The BC indicator BCI, contained in the ACM 150, has a value which indicates that the called terminal device 36a is free. The OBC indicator OBCI of the ACM 150 has a value which indicates that an inband information item is now available; i.e., that a ringing tone has already been applied.

If the subscriber TlnB answers using the terminal device 36a, the terminal device 36a generates a connect message 152 at a time t20 and transmits it to the network access unit 44a. The network access unit 44a itself generates, on the basis of the connect message 152, a connect message 154 which is transmitted to the service provider computer 118 at a time t21. In the switching office 102, an ANM (Answer Message) 156 which is provided according to the ISUP standard is generated after the reception of the connect message 154. The billing begins on the basis of this message.

The ANM 156 is processed in the switching office 100. The switching office 100 checks, by reference to the note, whether it has brought about the switching-on of the ringing tone. If it has brought about the switching-on, it actuates the service provider computer 106 in such a way that the service provider computer 106 requests the ringing tone to be switched off. To do this, the service provider computer transmits, at a time t23, a change message 158 which is also referred to as an MDCX message according to the Defacto standard RFC 2307. The change message 158 contains a data field in which the deactivation of the ringing tone is requested. The tone generator 38a is switched off in the network gateway unit 28a during the processing of the change message 158. Otherwise the switching-off does not occur.

Furthermore, in the switching office 100, during the processing of the ANM 156, the ANM 160 provided in the ISUP standard, as at time t24, is forwarded to the next switching office; i.e., to the transit switching office 20a. The further transmission of the voice data takes place as provided for in the ISLTP standard or as provided for in the standard group relating to the standard H.323.

In another exemplary embodiment, the network access unit 44a waits for the call-proceeding message 130 from the terminal device 36a to arrive before it outputs the call-proceeding message 126. The Internet address and the port number are then immediately forwarded with the call-proceeding message 126. This permits the APM 142 to be output early. Instead of the change message 148, two separate change messages are generated, the second change message of which serves to switch on the ringing tone.

In a further exemplary embodiment, the Internet address and the port number are only forwarded with the connect message 152 to the network access unit 44a. The address indicators are transferred into the connect message 154 and transmitted to the switching office 102. The APM 142, the ACM 146 and the ANM 156 are not transmitted until after the connect message 154 has been received. The other processes remain unchanged.

FIG. 3 also illustrates function units for controlling the switching office 100 and for controlling the switching office 102. The switching office 100 contains a distribution function 162 which operates according to standard Q.704 of the ITU-T. In addition, there is an ISUP module 164 which processes the information elements which are transmitted between the switching offices 100 and 102 in order to transfer the Internet addresses and the port numbers. The A-end call controller 52a is connected to the ISUP module 164 via an internal signaling protocol 166 of the switching office 100. Messages are also exchanged between the service provider computer 106 and the A-end call controller 52a and/or between the ISUP module 164 and the service provider computer 106 in compliance with the internal signaling protocol 166.

Likewise, the switching office 102 contains a distribution function 168 which transfers functions specified in the standard Q.704 of the ITU-T. The switching office 102 contains, as a partner module of the module 164, an ISUP module 170 which processes and/or generates the information elements which are necessary for signaling the Internet address and the port number. An internal signaling protocol is used for exchanging signaling messages between the B-end call controller 50a and the ISUP module 170, the signaling protocol being based to a very large extent on the ISUP protocol, as is the internal signaling protocol 166. The internal signaling protocol 172 is also used to exchange signaling messages between the module 170 and the service provider computer 118 and/or between the B-end call controller 50a and the service provider computer 118.

Figure 4:
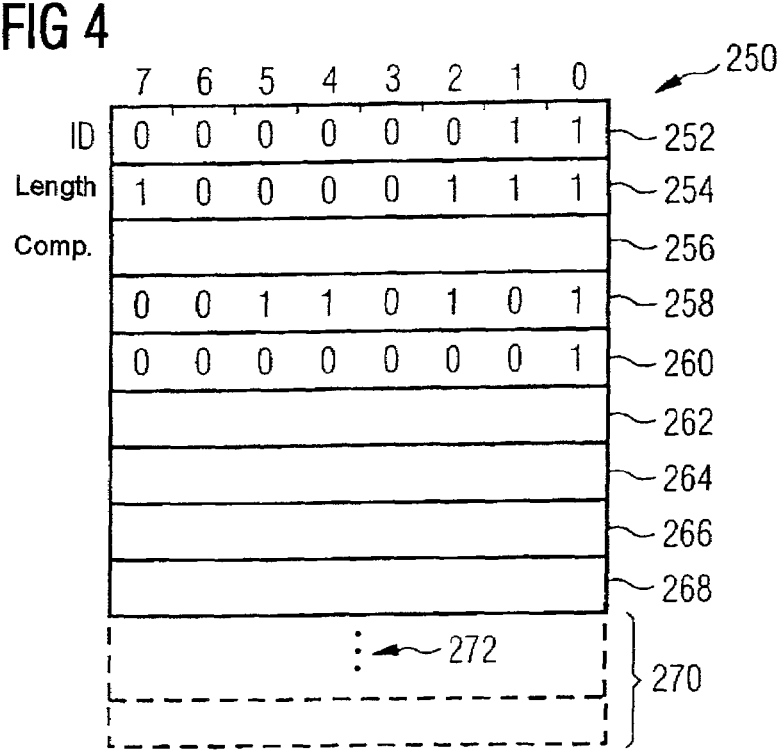
FIG. 4 shows the structure of an information element for transmitting an Internet address.

FIG. 4 shows the setup of an information element 150 for transmitting an Internet address. The information element 250 contains, in a first exemplary embodiment, nine successive data fields 252 to 268 which each have a length of eight bits; i.e., of one byte. Bit positions 0 to 7 run from right to left in this sequence. In the data field 252, an identifier for identifying the information element 250 is transmitted. The identifier has the value 3, which is used as a reference to what is referred to as an "interworking function address" in the standard Q.765.5, and which indicates here that the information element 250 is used to transmit an Internet address.

The length of the information element 250 minus the data fields 252 and 254 is given in a data field 254. In the exemplary embodiment, the value seven is stored in binary form in the data field 254; see also standard Q.765.5, section 11.1.1.

A compatibility information item, whose value indicates to the receiver what is to be done if it cannot process the information element 250 completely, see also standard Q.765.5, section 11.1.1, is transmitted in the data field 256.

An authorization and format identifier, which has the value "35" in hexadecimal notation, is transmitted in the data field 258. This value is used as a reference to the Internet protocol according to standard X.213 Annex A of the ITU.

An identifier with the value one is stored in the data field 260 if an Internet address is transmitted in compliance with the Internet protocol version 4. In the adjacent data fields 262 to 268, the four bytes of the Internet address according to version 4 of the Internet protocol are then transmitted.

If, on the other hand, the information element 250 is to be used to transmit an Internet address in compliance with the Internet protocol version 6, there results a deviation in the length indicator, see data field 254, and a deviation in the data field 260. In the data field 260, the value zero is transmitted during the transmission of Internet addresses in compliance with the Internet protocol version 6. In this case, the data field 260 is adjoined by sixteen data fields 262 to 270 in which the 16 bytes of the Internet address are stored in compliance with the Internet protocol version 6, see also points 272.

Figure 5:
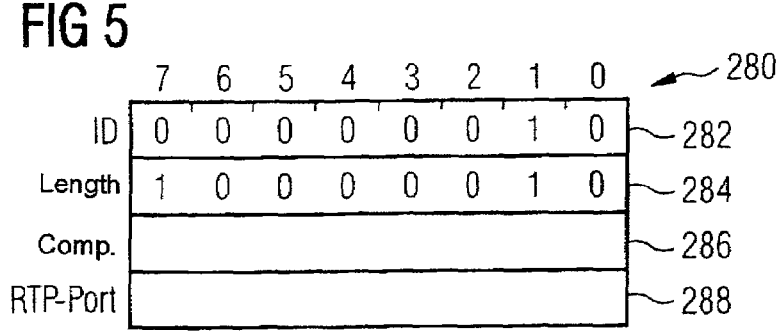
FIG. 5 shows the structure of an information element for transmitting an RTP port number.

FIG. 5 shows the setup of an information element 280 for transmitting a port number. The information element 280 contains four data fields 282 to 288, each one byte in length. The significance of the data fields 282 to 286 corresponds in this sequence to the significance of the data fields 252 to 256 of the information element 250. The value two is transmitted in the data field 282 in order to identify the information element 280 as an information element for the transmission of a port number. The identifier transmitted in the data field 282 is designated, in contrast with the function provided here, as a "backbone network connection identifier" in the standard Q.765.5. In a data field 284, the value two is transmitted as the length of the information element 280 minus the data fields 282 and 284. In the data field 286, an information item relating to the compatibility is transmitted. In the data field 288, the port number to be transmitted is then transmitted; i.e., the port number to be used in the network access unit 28a or in the terminal device 36a for the RTP connection, see FIG. 3.

Figure 6:
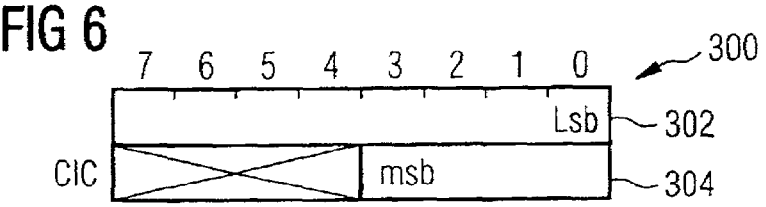
FIG. 6 shows the structure of a code element for designating the call entity.

FIG. 6 shows the setup of a code element 300 which is used for designating call entities between the switching offices 100 and 102, see FIG. 3. The setup of the code element 300 is defined in the standard Q.763, section 1.2. The code element 300 contains two data fields 302 and 304, each with a length of one byte. The number of the entity is transmitted starting with the least significant bit in the data field 302, see bit position 0, up to the bit position 7 of the data field 302 and then on between the bit positions 0 to 3 of the data field 304. The bit positions 4 to 7 of the data field 304 are not used to designate the entity. The code element 300 has any further data fields.

FIG. 7 shows a network gateway function which is formed by a switching office 310 and a network gateway unit 28b which is spatially separated therefrom. Function elements which are shown in FIG. 7 and which have essentially the same structure and the same function as function elements already explained with reference to FIGS. 1 through 3 are represented in FIG. 7 by the same reference, but with the lower-case letter "b" placed after them. The call controllers 52b and 50b are accommodated in the same switching office 310. In addition, the two service provider computers 106b and 118b are installed in the same switching office 310. There is only one internal signaling protocol 166b in the switching office 310. The messages 112b, 142b, 146b and 156b are exchanged, instead of the messages 112, 142, 146 and 156, between the call controller 50b and the call controller 52b, see brackets 312, using the internal signaling protocol 166b. Otherwise, the processes explained above with reference to FIG. 3 also apply to FIG. 7.

In another exemplary embodiment, the network gateway unit 28b is also contained in the switching office 310. In this case, the internal signaling protocol 166b of the switching office 310 is also used for transferring messages between the service provider computer 106b and the network gateway unit 28b.

In a further exemplary embodiment, the protocol SIP (Session Invocation Protocol) according to RFC 25423 or another suitable protocol is used between the units 36b, 44b and 118b illustrated on the right-hand side of FIG. 7, instead of the protocol from the protocol family H.323.

In another refinement, an ATM network is used instead of the data packet transmission network 14, 14a and 14b which operates in compliance with the Internet protocol. In this case, the protocol BICC from the standard Q.1901 of the ITU-T is used for signaling between the switching offices 100 and 102. However, the protocol BICC can also be used for signaling in an IP network.

The components mentioned in the exemplary embodiments are, for example, components of the SURPASS system from SIEMENS AG, see WEB page www.siemens.com/data&voice. The data provider computers are thus part of the hiQ component of the SURPASS system.

Although the present invention has been described with reference to specific embodiments, those of skill in the art will recognize that changes may be made thereto without departing from the spirit and scope of the invention as set forth in the hereafter appended claims.

The invention claimed is:

1. A method for switching on a subscriber signal, the method comprising the steps of:
   defining a transmission path from a calling terminal device of a switched-through telecommunications network to a called terminal device of a packet transmission network using a network gateway function;
   indicating, via a signaling message which is defined for the packet transmission network and which comes from the called terminal device end, that the called terminal device is signaling the call to a subscriber;
   generating, when the signaling message which is defined for the packet transmission network occurs, a following signaling message which indicates that a subscriber signal has not yet been generated for the calling terminal device;
   processing the following signaling message, wherein the switching-on of the subscriber signal for the calling terminal device is brought about; and
   generating a standard signaling message which is defined for the switched-through telecommunications network and which indicates that the subscriber signal has already been generated for the calling terminal device, wherein signaling messages with a same structure as the following signaling message are transmitted, within a switching office of the switched-through network, to at least one of connecting units for connecting subscribers, connecting units for connecting user data transmission paths to other switching offices of the switched-through network, and connecting units for providing the network gateway function.

2. A method for switching on a subscriber signal as claimed in claim 1, wherein the following signaling message is a signaling message which is defined for the switched-through telecommunications network and with which it is indicated that sufficient dialing digits have been transmitted.

3. A method for switching on a subscriber signal as claimed in claim 1, wherein at least one of the standard signaling message and the following signaling message is a signaling message which has a structure which is defined in a standard which is one of an ISUP standard, a BICC standard, and a standard which is based on one of these standards.

4. A method for switching on a subscriber signal as claimed in claim 1, wherein the following signaling message is a signaling message which is defined for the signaling within a switching office of the switched-through network.

5. A method for switching on a subscriber signal as claimed in claim 1, wherein the network gateway function is provided using at least two spatially separated units.

6. A method for switching on a subscriber signal as claimed in claim 5, the method further comprising the steps of:
   transmitting, via a network gateway unit, the user data between the switched-through telecommunications network and the packet transmission network; and
   controlling the network gateway unit by a spatially remote control unit, via a defined control protocol which is one of protocol H.248, protocol MGCP, and a protocol based on one of said H.248 or MGCP protocols.

7. A method for switching on a subscriber signal as claimed in claim 5, the method further comprising the step of:
   transmitting the standard signaling message via a switching office of the switched-through telecommunications network.

8. A method for switching on a subscriber signal as claimed in claim 7, the method further comprising the step of:
   generating the following signaling message via a further spatially remote switching office of the switched-through telecommunications network.

9. A method for switching on a subscriber signal as claimed in claim 1, wherein the packet transmission network is a network which operates according to one of an Internet protocol, an ATM protocol, and a protocol based on one of said Internet or ATM protocols.

10. A method for switching on a subscriber signal as claimed in claim 1, wherein the switched-through telecommunications network is a network in which data are transmitted in time slots according to a time-division multiplex method.

11. A method for switching on a subscriber signal as claimed in claim 1, wherein the switched-through telecommunications network signaling is carried out according to one of an ISUP standard and a standard which is based on the ISUP standard.

12. A method for switching on a subscriber signal as claimed in claim 1, wherein the packet transmission network signaling is carried out according to one of an H.323 protocol, an SIP protocol, and a protocol which is based on one of said H.323 or SIP protocols.

13. A method for switching on a subscriber signal as claimed in claim 1, wherein there is no further switching office of the switched-through telecommunications network in at least one of the signaling path and the transmission path between a switching office which brings about the switching on of the subscriber signal and a unit of the network gateway function.

14. A method for switching on a subscriber signal as claimed in claim 1, wherein there is at least one further switching office of the switched-through telecommunications network in at least one of the signaling path and the transmission path between a switching office which brings about the switching on of the subscriber signal and a unit on the network gateway function.

15. A method for switching on a subscriber signal as claimed in claim 1, wherein the switching office which brings about the switching on is an originating switching office to which the calling terminal device is connected.

16. A method for switching on a subscriber signal as claimed in claim 1, wherein the subscriber signal is fed into a unit for transferring user data between the switched-through telecommunications network and the packet transmission network.

17. A method for switching on a subscriber signal as claimed in claim 1, wherein the subscriber signal is one of a ringing tone and an announcement which indicates that the called terminal device is signaling the call for a subscriber.

18. A method for switching on a subscriber signal as claimed in claim 1, wherein the following signal message contains an indicator whose value depends on whether the called terminal device is occupied, the indicator of an occupied state and the indicator of the subscriber signal are checked by reference to the following signaling message, and the switching on of the subscriber signal is brought about only if the called terminal device is free and the subscriber signal has not yet been generated.

19. A method for switching on a subscriber signal as claimed in claim 1, wherein a switching office is provided such that during operation of the switching office the method is carried out.

20. A method for switching on a subscriber signal as claimed in claim 1, wherein upon execution of an instruction sequence of a program, the method is carried out by a processor.

* * * * *